United States Patent [19]

Matsuyama

[11] 4,117,082

[45] Sep. 26, 1978

[54] METHOD OF COMPLETELY OXIDIZING CARBON MONOXIDE

[75] Inventor: Akira Matsuyama, Toyonaka, Japan

[73] Assignee: Figaro Giken Co., Ltd., Toyonaka, Japan

[21] Appl. No.: 766,118

[22] Filed: Feb. 7, 1977

Related U.S. Application Data

[62] Division of Ser. No. 565,730, Apr. 7, 1975, abandoned.

[30] Foreign Application Priority Data

Apr. 19, 1974 [JP]  Japan ................................. 49-44896
Apr. 26, 1974 [JP]  Japan ................................. 49-48200

[51] Int. Cl.$^2$ ............................................. B01D 53/34
[52] U.S. Cl. ................................... 423/247; 423/213.5; 252/457; 252/460; 252/466 PT; 252/473; 252/475
[58] Field of Search .................. 423/212, 213.2, 213.5, 423/247; 252/457, 466 PT, 475, 460, 473

[56] References Cited

U.S. PATENT DOCUMENTS

| | | | |
|---|---|---|---|
| 3,840,471 | 10/1974 | Acres | 423/213.5 X |
| 3,873,469 | 3/1975 | Foster et al. | 423/213.5 X |
| 3,912,658 | 10/1975 | Kaneko et al. | 423/213.5 |
| 3,966,391 | 6/1976 | Hindin et al. | 423/213.5 X |

*Primary Examiner*—Earl C. Thomas
*Attorney, Agent, or Firm*—Frank J. Jordan

[57] ABSTRACT

Catalyst useful to purify exhaust gases from motor vehicles and the like comprising $SnO_2$ and at least one of Pt, Pd, Rh, Ir and Ru added thereto to ensure improved activity. The catalyst may further contain silica and is thereby improved in mechanical strength. Ceramic fibers, when additionally incorporated into the catalyst, further increases the mechanical strength of the catalyst.

2 Claims, No Drawings

METHOD OF COMPLETELY OXIDIZING CARBON MONOXIDE

This is a division of application Ser. No. 565,730, filed Apr. 7, 1975, and now abandoned.

BACKGROUND OF THE INVENTION

The present invention relates to catalysts useful to purify air and exhaust gases containing carbon monoxide and resulting from incomplete combustion, and more particularly to a catalyst useful in removing carbon monoxide from exhaust gases from motor vehicles.

In recent years, air pollution owing to exhaust gases from motor vehicles poses a serious environmental problem, and it becomes critical to eliminate pollutants from such emissions for pollution control. Exhaust gases from internal combustion engines contain large amounts of carbon monoxide which is most harmful to the human body. Especially in cities with heavey traffic, the harmful component causes pollution with ever increasing seriousness. Complete oxidation with catalysts is found to be most effective to completely eliminate the carbon monoxide, so that various attempts have been made to develop catalysts which are useful for this purpose.

Catalysts for purifying motor vehicle emissions must fulfill the following requirements:

(1) High activity under low temperature conditions so that the catalyst is fully serviceable when the engine gives off an exhuast gas of low temperature and high carbon monoxide concentration upon starting, during idling or during low-speed or constant-speed operation.

(2) Heat resistance enabling the catalyst to remain active at high temperatures as when the engine is driven at high speeds while producing an exhaust gas whose temperature may possibly reach 800° C.

(3) Outstanding mechanical strength, such as high abrasion resistance, against severe heat cycles or vibrations during operation which would deteriorate the mechanical strength of the catalyst or might release an active component from the catalyst.

(4) Resistance to poisons such as lead compounds added to gasoline as antiknock agents and sulfur compounds and halogen compounds contained in small amounts in gasoline.

(5) Activity maintained in spite of marked changes in the temperature and concentration of the exhaust gas.

(6) Stability permitting the catalyst to remain active free of thermal degradation at high temperatures.

Although researches have been carried out in an attempt to provide catalysts fulfilling such requirements, none of the known catalysts are satisfactory in these respects.

Catalysts usually employed to remove carbon monoxide are grouped into two general types: those of the platinum type and those of the metal oxide type. The former are extremely active over a wide range of temperatures and, moreover, have very high activities at low temperatures. In spite of such usefulness in their activity characteristics, however, they have the fatal drawbacks of being exceedingly low in resistance to poisons such as lead compounds, sulfur compounds and halogen compounds and subject, at high temperatures, to sintering which impairs their activity and renders them unusable for a long period of time. During use, accordingly, they must be treated repeatedly for regeneration, and further difficulties are then experienced. For example, the user is usually unable to know to what extent the catalyst has been degraded. In addition, the amount of platinum catalyst usable is limited from the viewpoint of economy and resources.

On the other hand, catalysts of the metal oxide type, although generally superior to platinum catalysts in resistance to heat and to poisons, have the disadvantages of being much inferior to the platinum catalysts in respect of the catalytic activity over a wide temperature range and exhibiting low activities at low temperatures, so that they are not practically usable. However, these metal oxide catalysts include those recently developed such as $CoO$, $NiO$, $MnO_2$, $CuO$, $Fe_2O_3$, $ZnO$, $TiO_2$, $Cr_2O_3$, $V_2O_5$, etc. which have relatively high activities. For example, $MnO_2$—$CuO$ type catalysts are very active at low temperatures and initiate oxidation of carbon monoxide at a temperature of about 65° C. However, these catalysts are still low in the overall activity and are seriously poisoned with steam. In fact, they are degraded with the steam resulting from the combustion and contained in exhaust gases, so that they are not serviceable free of troubles as catalysts for purifying exhaust gases. CuO-type and CoO-type catalysts, although relatively active at low temperatures, also have a drawback. When supported by alumina which is usually used as a carrier to provide increased surface area and mechanical strength and to improve thermal stability, they exhibit a high solid phase reactivity with alumina to form aluminates, which greatly reduce their catalytic activity. Thus they are not usable with alumina which is generally the most favorable carrier.

In the preparation of catalysts using the above-mentioned metal oxides, the catalyst is shaped to a suitable size usually by sintering. To increase abrasion resistance and like mechanical strength, there is the necessity of increasing the sintering temperature, whereas when subjected to a high temperature, the catalyst can no longer retain the desired activity. Supposedly, glass frit may be employable as a binder to ensure increased mechanical strength but, even in this case, the binder bonds the particles of catalyst together, consequently reducing the catalytic activity. Thus it is impossible to improve both mechanical strength and catalytic activity; indeed the conventional sintering method involves the alternative of mechanical strength or activity, and the two requirements can not be fulfilled at the same time.

SUMMARY OF THE INVENTION

An object of this invention is to provide a catalyst for completely oxidizing carbon monoxide which catalyst has a high activity at low temperatures.

Another object of this invention is to provide an oxidizing catalyst having thermal resistance so that the catalyst retains its activity at high temperatures.

Another object of this invention is to provide an oxidizing catalyst which is excellent in mechanical strength as in abrasion resistance.

Another object of this invention is to provide an oxidizing catalyst which is resistant to poisons such as lead compounds, sulfur compounds and halogen compounds.

Another object of this invention is to provide an oxidizing catalyst which retains its activity even when subjected to marked changes in temperature and concentration.

Still another object of this invention is to provide an oxidizing catalyst which can be prepared in large amounts and inexpensively.

The present invention provides a catalyst for completely oxidizing carbon monoxide comprising $SnO_2$ and a small amount of at least one of platinum group metals including Pt, Pd, Rh, Ir and Ru added to $SnO_2$ as an activity promoting agent. Preferably, such metal is used in an amount of 2 to 20 atm. % based on $SnO_2$.

DETAILED DESCRIPTION OF THE INVENTION

The catalyst of this invention has a higher carbon monoxide oxidizing activity than catalysts consisting singly of platinum metal, composite catalysts of the platinum type and metal oxide catalysts heretofore known. It is most noteworthy that the present catalyst is extremely active at low temperatures. While it is known that the aforementioned $MnO_2$—CuO type catalysts, which have the most excellent low-temperature activities among the conventional carbon monoxide oxidizing catalysts, initiate oxidation of carbon monoxide at a temperature of about 65° C., the catalyst of this invention initiates its activity even at such a low temperature as about 30° C. Moreover, since the catalyst exhibits a rapidly accelerated activity as the temperature rises from that level, it maintains its activity over a wide temperature range from low temperatures to high temperatures. Because of high resistance to poisons such as lead, sulfur and halogen compounds, the present catalyst is free of degradation due to poisoning during use. The fact that despite the presence of platinum metal such as Pt, Pd, Rh, Ir or Ru contained as an ingredient, the present catalyst is not subject to poisoning unlike the foregoing platinum-type catalysts suggests that the oxidizing catalytic activity is given not by the platinum metal ingredient itself but solely by $SnO_2$ and that the platinum metal acts to promote that activity.

The catalyst of this invention is further characterized in that it is free of poisoning with steam unlike other metal oxides having high carbon monoxide oxidizing activities. The present catalyst has another feature that even when used at high temperatures, it is least susceptible to deterioration due to sintering because $SnO_2$ is not amenable to sintering.

Although the present catalyst is employable singly as it is, it can also be used as supported by $Al_2O_3$, $SiO_2$, magnesia or like carrier. Where it is desired to assure effective purification of emissions with a small amount of catalyst, it is preferable to use a carrier for the catalyst and to thereby increase the surface area.

Because of the stability at high temperatures, $SnO_2$ has the drawback that the compound is not amenable to sintering so that it is impossible to substantially increase the mechanical strength of the catalyst by sintering. This can be remedied by incorporating silica into the catalyst prepared by adding a platinum metal to $SnO_2$. To incorporate silica into the catalyst, the catalyst is impregnated with silicic acid hydrosol or a solution of silicic acid ester, and the impregnated catalyst is heated or fired at about 800° C. This temperature is much lower than the temperature (about 1,100° C.) at which usual $SnO_2$-type catalysts are sintered to increase the mechanical strength thereof. Accordingly, the firing treatment will not impair the activity of the catalyst. The silica thus incorporated into the catalyst serves as a binder, rendering the catalyst extremely rigid and tough, with the result that the catalyst is capable of withstanding adverse conditions such as vibration, impact, scratching and the like encountered as when it is used to purify the exhaust gas from motor vehicles. In addition, the catalyst is highly sensitive. Clay, preferably kaolin, is also useful as a binder for increasing the mechanical strength.

Alternatively, the silica incorporating step may be carried out by impregnating the catalyst with a specified solution and thereafter dehydrating the impregnated catalyst with concentrated sulfuric acid. More specifically, the catalyst is immersed in silicic acid hydrosol, then dried and thereafter immersed in concentrated sulfuric acid. Subsequently the catalyst is washed with water and dried. Furthermore it is possible to add an organic silicon compound, such as $(CH_3)_4Si$, $(CH_3)_3SiH$, $(CH_3)_2Si(OH)_2$ or the like, to the $SnO_2$ catalyst and to thereafter heat or fire the mixture to thereby oxidize the compound, whereby silica can be incorporated into the catalyst. In some cases, the silica resulting from these various silica incorporating steps may be in the form of silica gel depending on the extent of heating or dehydration. The effect contemplated by this invention is fully attainable even in such case. Thus the silica incorporated into the catalyst as set forth in this specification and in the appended claims can be in the form of silica gel.

The catalyst of this invention is actually put to use as mixed with an extender or a structural material such as $Al_2O_3$, $SiO_2$ or the like to thereby increase, to the greatest possible extent, the surface area of the catalyst to be brought into contact with the gas. Such material is usable in the form of particles as in usual manner. According to this invention, however, the material is mixed with the catalyst in the form of alumina fibers, silicic acid fibers or like ceramic fibers to further increase the strength of the catalyst.

This invention will be described below with reference to examples.

EXAMPLE 1

$SnCl_4.5H_2O$ was dissolved in water, and the solution was adjusted to a pH of 9 with ammonia water to obtain a white precipitate, which was filtered off, collected, thoroughly washed with water and then dried with air at 100° C. The product was fired in air at 800° C. for 2 hours using an electric oven to prepare $SnO_2$, which was pulverized in a ball mill for about 3 days to obtain finely divided $SnO_2$. To the finely divided $SnO_2$ was added an aqueous solution of rhodium chloride in an amount of 5 atm. % calculated as Rh based on the $SnO_2$, and the mixture was fired in an electric oven at 800° C. for 1 hour to obtain a catalyst, which was suspended in water. To the suspension was added 300-mesh $\alpha$-$Al_2O_3$ in an amount equal to that of the $SnO_2$. The mixture was fully dried at 100° C. to remove water therefrom and was then left to stand at 300° C. for 1 day for aging whereby an $SnO_2$—Rh-$Al_2O_3$ catalyst was obtained. The catalyst was shaped into cylindrical columns, 3 mm in diameter and 5 mm in length. The catalyst was thereafter tested for its activity to oxidize carbon monoxide with the results given in Table 1. For testing, the shaped catalyst was packed in a reactor tube to form a catalyst layer, and a gas of the below-given composition was passed through the tube. The carbon monoxide concentration of the gas was measured at the inlet and outlet of the tube.

Table 1

| Reaction temperature (° C) | Conversion of CO (%) |
|---|---|
| 34 | 1.9 |
| 48 | 84.2 |

Table 1-continued

| | |
|---|---|
| 79 | 100 |
| 112 | 100 |
| 300 | 100 |
| 600 | 100 |
| Reaction conditions: | |
| Composition of gas | |
| CO | 10% |
| $O_2$ | 18 |
| $N_2$ | 72 |
| Space velocity | |
| $6 \times 10^4 \, h^{-1}$ | |

Table 1 reveals that in spite of the high space velocity of 60,000 $h^{-1}$, the catalyst achieves 100% conversion of CO to $CO_2$ at 79° C. and that the activity of the catalyst, initiated at a temperature of below 34° C., attains a high conversion of 84.2% at 48° C.

EXAMPLE 2

A catalyst of the $SnO_2$—Pt—$Al_2O_3$ type was prepared in the same manner as in Example 1 except that in place of rhodium chloride chloroplatinic acid was used in an amount of 7 atm. % calculated as Pt based on $SnO_2$. A gas composed of 10% of CO, 18% of $O_2$ and 72% of $N_2$ was subjected to oxidation reaction at a space velocity of 60,000 $h^{-1}$ with the catalyst to determine the carbon monoxide oxidizing activity of the catalyst. The results are listed in Table 2.

Table 2

| Reaction temperature (° C) | Conversion of CO (%) |
|---|---|
| 59 | 4.3 |
| 78 | 6.7 |
| 115 | 92.3 |
| 147 | 100 |
| 237 | 100 |
| 600 | 100 |

EXAMPLE 3

A catalyst of the $SnO_2$—Pd—$Al_2O_3$ type was prepared in the same manner as in Example 1 except that palladium chloride was used in place of rhodium chloride. Under the same conditions as in Example 1, the catalyst was tested for its carbon monoxide oxidizing activity, with the results shown in Table 3.

Table 3

| Reaction temperature (° C) | Conversion of CO (%) |
|---|---|
| 33 | 7.7 |
| 56 | 63.6 |
| 80 | 91.9 |
| 110 | 100 |
| 143 | 100 |
| 193 | 100 |
| 265 | 100 |
| 489 | 100 |
| 600 | 100 |

The table above indicates that the catalysts initiates its activity at a very low temperature of below 33° C., exhibiting a rapidly increasing activity with the rise of temperature, and achieves 91.9% of conversion of carbon monoxide at 80° C.

EXAMPLE 4

Samples of the $SnO_2$—Pd—$Al_2O_3$ catalyst used in Example 3 were held in contact with steam, mist of lead acetate, $H_2S$ and vapor of carbon tetrachloride, respectively, at 200° C. for 2 days, and the catalyst samples were then tested for carbon monoxide oxidizing activity under the same reaction conditions as in Example 1 at a constant reaction temperature of 200° C. The results, shown in Table 4, reveal that all the samples were free of degradation.

Table 4

| Poison | Conversion of CO (%) |
|---|---|
| Steam | 100 |
| Lead acetate mist | 100 |
| $H_2S$ gas | 100 |
| Carbon tetrachloride vapor | 100 |
| None | 100 |

COMPARISON EXAMPLE 1

$SnO_2$ prepared in the same manner as in Example 1 was shaped in the same manner as in Example 1 without using any other ingredient, and the product was tested for carbon monoxide oxidizing activity, with the results given in Table 5.

Table 5

| Reaction temperature (° C) | Conversion of CO (%) |
|---|---|
| 75 | 0 |
| 127 | 0 |
| 184 | 0 |
| 210 | 0 |
| 250 | 4.3 |
| 278 | 12.4 |
| 310 | 28.2 |
| 339 | 77.9 |
| 370 | 91.9 |
| 408 | 96.2 |
| 447 | 98.1 |
| 492 | 99.5 |
| 500 | 99.5 |
| 600 | 99.5 |
| 700 | 99.8 |

The above table indicates that the catalyst consisting singly of $SnO_2$ and containing none of Pt, Pd, Rh, etc. is much lower than those of the foregoing Examples in activity, especially in low-temperature activity, exhibiting a gently accelerated activity as the temperature rises from the activity initiating temperature.

EXAMPLE 5

A catalyst of the $SnO_2$—Ir—$Al_2O_3$ type was prepared in the same manner as in Example 1 except that iridium tetrachloride was used in place of rhodium chloride. Under the same conditions as in Example 1, the catalyst was tested for its carbon monoxide oxidizing activity, with the results shown in Table 6.

Table 6

| Reaction temperature (° C) | Conversion of CO (%) |
|---|---|
| 55 | 3.4 |
| 81 | 6.6 |
| 120 | 90.3 |
| 189 | 100 |
| 340 | 100 |
| 600 | 100 |

EXAMPLE 6

A catalyst of the $SnO_2$—Ru—$Al_2O_3$ type was prepared in the same manner as in Example 1 except that ruthenium trichloride was used in place of rhodium chloride. Under the same conditions as in Example 1, the catalyst was tested for its carbon monoxide oxidizing activity, with the results given in Table 7 below.

Table 7

| Reaction temperature (° C) | Conversion of CO (%) |
|---|---|
| 59 | 2.7 |
| 82 | 5.6 |
| 110 | 72.8 |

Table 7-continued

| Reaction temperature (° C) | Conversion of CO (%) |
|---|---|
| 174 | 100 |
| 252 | 100 |
| 300 | 100 |
| 600 | 100 |

EXAMPLE 7

SnCl.5H$_2$O was dissolved in water, and the solution was adjusted to a pH of 9 with ammonia water to obtain a white precipitate, which was collected by filtration, thoroughly washed with water and then dried with air at 100° C. The product was fired in air at 800° C. for 2 hours using an electric oven to prepare SnO$_2$, which was pulverized in a ball mill for about 3 days to obtain finely divided SnO$_2$. To the finely divided SnO$_2$ was added an aqueous solution of rhodium chloride in an amount of 5 atm. % calculated as Rh based on the SnO$_2$, and the mixture was fired in an electric oven at 800° C. for 1 hour to obtain a catalyst, which was suspended in water. To the suspension was added 300-mesh α-Al$_2$O$_3$ in an amount equal to that of the SnO$_2$. The mixture was fully dried at 100° C. to remove water therefrom and was then left to stand at 300° C. for 1 day for aging, whereby an SnO$_2$—Rh—Al$_2$O$_3$ catalyst was obtained. The catalyst was shaped into cylindrical columns, 3 mm in diameter and 5 mm in length.

Separately to 75 cc of tetraethyl silicate and 25 cc of water was added 0.3 cc of hydrochloric acid, and the mixture was stirred for 30 minutes to obtain a transparent solution, namely silicic acid hydrosol, which when dried would be silica gel having a very low mechanical strength.

The shaped catalyst was immersed, after cooling, in the solution for about 10 seconds, and the wet catalyst was then progressively heated to a temperature of 600° C., whereby silica was incorporated into the catalyst. Because of the presence of the silica serving as a binder, the catalyst obtained was extremely rigid and tough, fully capable of withstanding adverse conditions such as vibration, impact and scratching, almost free of changes with the lapse of time and outstanding in its catalytic activity. More specifically, the resulting catalyst was packed in a reactor tube in the form of a layer, and a gas composed of 10% of CO, 18% of O$_2$ and 72% of N$_2$ was passed through the tube at a space velocity of 6 × 10$^4$ h$^{-1}$ to determine the carbon monoxide oxidizing activity of the catalyst. The oxidation initiating temperature of the catalyst was found to be 70° C., and 100% conversion of CO to CO$_2$ was achieved at 200° C.

EXAMPLE 8

A catalyst was prepared in the same manner as in Example 5 except that in place of rhodium chloride chloroplatinic acid was used in an amount of 5 atm. % calculated as Pt based on SnO$_2$. Under the same conditions as in Example 5, the catalyst was tested for its oxidizing activity to find that the catalyst initiated oxidation of carbon monoxide at a temperature of 80° C. and attained 90% conversion of CO at 200° C.

EXAMPLE 9

A catalyst was prepared in the same manner as in Example 5 except that in place of rhodium chloride palladium chloride was used in an amount of 5 atm. % calculated as Pd based on SnO$_2$. Under the same conditions as in Example 5, the catalyst was tested for its oxidizing activity, with the result that the catalyst initiated oxidation of carbon monoxide at a temperature of 70° C. and achieved 100% conversion of CO at 200° C.

EXAMPLE 10

A catalyst was prepared in the same manner as in Example 5 except that in place of rhodium chloride iridium tetrachloride was used in an amount of 5 atm. % calculated as Ir based on SnO$_2$. Under the same conditions as in Example 5, the catalyst was tested for its oxidizing activity to find that the catalyst initiated oxidation of carbon monoxide at a temperature of 80° C. and achieved 90% conversion of CO at 200° C.

EXAMPLE 11

A catalyst was prepared in the same manner as in Example 5 except that in place of rhodium chloride ruthenium trichloride was used in an amount of 5 atm. % calculated as Ru based on SnO$_2$. Under the same conditions as in Example 5, the catalyst was tested for its oxidizing activity to find that the catalyst initiated oxidation of carbon monoxide at a temperature of 80° C. and achieved 90% conversion of CO at 200° C.

EXAMPLE 12

To a powdery catalyst of the SnO$_2$—Pt type (mean particle size: about 5 μm) incorporating 5 atm. % of Pt based on SnO$_2$ was added about 10 ml of water, and the mixture made into a slurry, to which 20 g of alumina fibers were added. The resulting mixture was thoroughly kneaded and then shaped into cylindrical columns measuring 3 mm in diameter and 5 mm in length. The shaped catalyst was air-dried for 1 day. The product was then immersed in a solution of 100 g of ethyl silicate and 5 g of concentrated hydrochloric acid in 100 g of water for 5 minutes and was thereby thoroughly impregnated with the solution. The catalyst was then dried in air for 1 day and thereafter fired in an electric oven at 800° C. for 1 hour. The catalyst thus prepared was found to be greatly improved in mechanical strength as compared with one incorporating alumina particles in place of alumina fibers but was as active as the latter catalytically. More specifically, when tested with a gas composed of 10% of CO, 18% of O$_2$ and 72% of N$_2$ and flowing at a space velocity of 6 × 10$^4$ h$^{-1}$, both the catalysts initiated oxidation of carbon monoxide at a temperature of 80° C. and attained 90% conversion of CO at 200° C.

EXAMPLE 13

A catalyst was prepared in the same manner as in Example 10 except that Pd was used in place of Pt. The catalyst was tested for oxidizing activity to find that it initiated oxidation of carbon monoxide at a temperature of 70° C. and achieved 100% conversion of CO at 200° C.

EXAMPLE 14

A catalyst prepared in the same manner as in Example 10 except that Rh was used in place of Pt was tested for oxidizing activity. The catalyst initiated oxidation of carbon monoxide at a temperature of 70° C. and achieved 100% conversion of CO at 200° C.

EXAMPLE 15

A catalyst prepared in the same manner as in Example 10 except that Ir was used in place of Pt was tested for oxidizing activity. The catalyst initiated oxidation of carbon monoxide at a temperature of 80° C. and achieved 90% of conversion of CO at 200° C.

EXAMPLE 16

A catalyst prepared in the same manner as in Example 10 except that Ru was used in place of Pt was tested for oxidizing activity. The catalyst initiated oxidation of carbon monoxide at a temperature of 80° C. and achieved 90% of CO conversion at 200° C.

As described above, the catalyst of this invention comprises $SnO_2$ and at least one of Pt, Pd, Rh, Ir and Ru added to the $SnO_2$. The catalyst gives substantially the same effectiveness as shown in the foregoing examples insofar as it contains any one of these platinum group metals irrespective of whether the catalyst is supported by a carrier or not. Especially the present catalyst has an outstanding activity at low temperatures and exhibits a sharply increasing effect as the temperature rises from the activity initiating temperature. It is excellent in resistance to poisons, in mechanical strength and in overall active properties.

What is claimed is:

1. A process for completely oxidizing carbon monoxide comprising contacting carbon monoxide in the presence of oxygen with a catalyst at a temperature as low as 79° C., wherein said catalyst is formed by firing at 800° C. for one hour a mixture of finely divided $SnO_2$ and an aqueous solution of rhodium chloride in an amount of 5 atm. % calculated as Rh based on the $SnO_2$, mixing an aqueous suspension of the fired product with finely divided alpha-$Al_2O_3$ in an amount equal to that of the $SnO_2$ and aging the resultant mixture at 300° C. for 1 day.

2. A process for completely oxidizing carbon monoxide comprising contacting carbon monoxide in the presence of oxygen with a catalyst at a temperature as low as 110° C., wherein said catalyst is formed by firing at 800° C. for 1 hour a mixture of finely divided $SnO_2$ and an aqueous solution of palladium chloride in an amount of 5 atm. % calculated as Pd based on the $SnO_2$, mixing an aqueous suspension of the fired product with finely divided alpha-$Al_2O_3$ in an amount equal to that of the $SnO_2$ and aging the resultant mixture at 300° C. for 1 day.

* * * * *